United States Patent [19]

Pape et al.

[11] 4,398,854
[45] Aug. 16, 1983

[54] BORING HEAD WITH FINE ADJUSTMENT MECHANISM

[75] Inventors: Dieter Pape, Rümlang; Hans Woerz, Oberhasli, both of Switzerland

[73] Assignee: Heinz Kaiser AG, Rümlang, Switzerland

[21] Appl. No.: 212,382

[22] Filed: Dec. 3, 1980

[30] Foreign Application Priority Data

Dec. 4, 1979 [CH] Switzerland ............... 10751/79

[51] Int. Cl.³ ............................................. B23B 51/00
[52] U.S. Cl. ................................. 408/185; 408/181; 408/198; 408/153
[58] Field of Search ............................ 408/146–154, 408/181–185, 198, 179, 157

[56] References Cited

U.S. PATENT DOCUMENTS

| | | | |
|---|---|---|---|
| 2,125,005 | 7/1938 | Jearum | 408/146 |
| 2,282,919 | 5/1942 | Zempel | 408/181 |
| 3,309,946 | 3/1967 | Thomas | 408/153 |

*Primary Examiner*—Robert E. Garrett
*Assistant Examiner*—Thomas Kline
*Attorney, Agent, or Firm*—Weiser, Stapler & Spivak

[57] ABSTRACT

The boring head has a tool holder in which the cutting tool is retained by a clamping screw. The tool holder is radially adjustable by an adjustment screw having a fine thread. The adjustment screw has a flange and a pressed-on knob which bears an adjustment scale. Between the knob and the flange, the annular portion of an insert is introduced, free of axial play. The annular portion of the insert is connected to the boring head by a set screw.

The insert with the annular portion also is provided with a clamping lip which can be pressed against the tool holder by a locking screw. The tool holder with its fine adjustment can be separately mounted and constitutes an easily replaceable unit.

4 Claims, 5 Drawing Figures

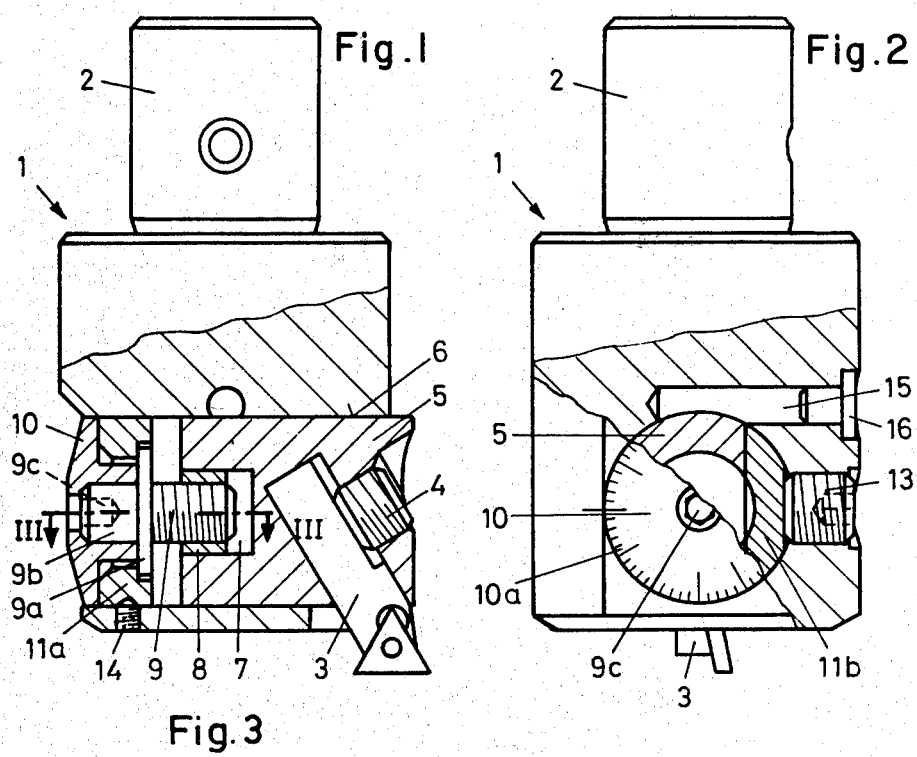
Fig.1
Fig.2
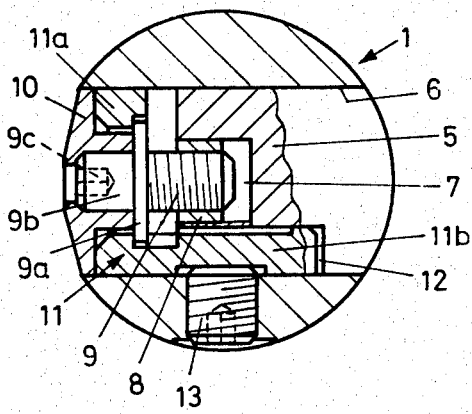
Fig.3
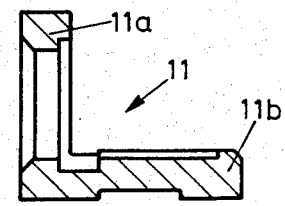
Fig.4
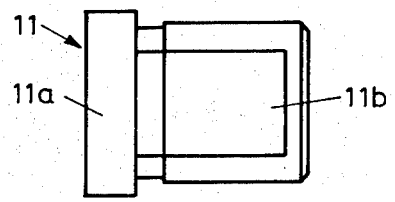
Fig.5

BORING HEAD WITH FINE ADJUSTMENT MECHANISM

The invention relates to a boring head having a fine adjustment for a cutting tool. Such boring heads are known. For example, from Swiss Pat. No. 393,039 there is know a connecting shaft with a tool head which can be attached to it and has an adjustment for a cutting tool. In this tool head, axial displacement of the adjustment screw relative to the tool head is prevented by providing a snap ring which extends into oppositely positioned ring-shaped grooves in the screw head and the tool head. However, such attachment is not free of play. For that reason, the tool head also has a diagonal hole into which a pretensioned helical spring is inserted which presses against the screw head via a spring plate and thereby renders the axial play harmless. This construction is relatively complex in manufacture and assembly and therefore expensive. Accordingly, it is an object of the present invention to make the fine adjustment mechanism simpler so that it results in freedom from play without springs and, furthermore, can be assembled and adjusted in a free-play manner outside the boring head.

This and other objects which will appear are accomplished in accordance with the invention by a system wherein the adjustment is accomplished by rotation of an adjustment screw which is attached to the boring head in an axially undisplaceable manner and whose knob is provided with an adjustment scale.

An insert is provided within a cylindrical hole, having an annular portion and at least one portion extending in the axial direction of the hole. The annular portion is positioned in a free-play manner between the knob provided with the adjustment scale and a flange of the rotatable adjustment screw, and the portion extending in the axial direction so adapted to be clamped radially against a tool holder by means of a locking screw. This construction makes it possible to assemble the actual tool holder with the fine adjustment mechanism separately and to adjust it in a free-play manner. It therefore constitutes a complete unit which can be introduced into the hole in the boring head and it is also possible to introduce a plurality of units in holes which are positioned axially behind one another.

The invention will be further explained by reference to the examples shown in the drawings. In these:

FIG. 1 shows a view, partially in cross-section, of a boring head,

FIG. 2 shows a view of the boring head of FIG. 1 turned by 90° and also partially sectioned, FIG. 3 is a cross-section taken along III—III in FIG. 1, FIG. 4 is a longitudinal section through the insert, and FIG. 5 is a top view of the insert.

The boring head 1 which is shown in FIGS. 1 to 3 has a cylindrical attachment stem 2. The cutting tool 3 is attached in known manner by means of a clamping screw 4 within tool holder 5. The tool holder 5 is inserted in a cylindrical transverse hole 6 in boring head 1. It has an axial hole 7 into which a bronze liner 8 is pressed. This liner is provided with a fine thread which engages the shaft of an adjustment screw 9. The adjustment screw 9 has a flange 9a which extends radially outward and a cylindrical extension 9b which is provided with a hexagonal inner hole 9c. Upon the cylindrical extension 9b, there is pressed a knob 10 with an adjustment scale 10a in such a manner as to be firmly connected with adjustment screw 9.

In the transverse hole 6, there is further positioned an insert 11 which is separately illustrated in FIGS. 4 and 5. It consists of an annular portion 11a and a portion 11b which extends in axial direction within hole 6. The annular portion 11a lies between the knob 10 and the flange 9a, in such a manner that the screw 9 is rotatable relative to the annular portion 11a but does not have any axial play.

The portion 11b which extends in the axial direction lies in a recess 12 within the tool holder 5. It serves as a clamp and can be pressed against the tool holder 5 by means of a backing screw 13. The annular portion 11a is rigidly fixed to the boring head by means of a set screw 14.

The boring head further has a hole 15 which is closed by a grease fitting 16. This serves to supply grease which is distributed along the hole 6 by grooves which have not been shown in the drawing.

To adjust the cutting tool 3, the locking screw 13 is loosened. The knob 10 is then rotated with reference to scale 10a by means of a wrench insertable into the hexagonal internal hole 9c of adjustment screw 9. As a result, the tool holder 5 is displaced axially by the desired amount. By means of locking screw 13, the tool holder is then fixed in the correct position.

The fine adjustment of the boring head which has been described has the advantage that the tool holder 5 with insert 11 and adjustment screw 9 with knob 10 can be separately assembled and adjusted in play-free manner. The tool holder 5 with its adjustment apparatus, therefore constitutes an easily exchangeable unit of the cartridge type.

We claim:

1. In a boring head having a fine adjustment mechanism for the cutting tool, which latter is attached to a tool holder that extends displaceably in a cylindrical hole extending transversely to the longitudinal axis, the adjustment being accomplished by rotation of an adjustment screw which has a flange and is attached to the boring head in an axially undisplaceable manner and whose knob is provided with an adjustment scale, the improvement which comprises including,
    an insert within the cylindrical hole, said insert having an annular portion and at least one portion extending in the axial direction of the hole, said annular portion being positioned in a free of play manner between said knob provided with the adjustment scale and a flange of said adjustment screw, and the portion extending in the axial direction being adapted to be clamped radially against the tool holder by means of a locking screw.

2. The boring head of claim 1 wherein,
    the annular portion of said insert is fixed within the hole in the boring head in radially and axially undisplaceable manner.

3. The boring head of claim 2 wherein said annular portion is fixed within said hole by means of a set screw.

4. The boring head of claim 1 wherein said annular portion is provided with a clamping lip whereby the locking screw causes said axially extending portion to press against the tool holder.

* * * * *